United States Patent

Jackson et al.

[15] 3,656,506
[45] Apr. 18, 1972

[54] FLOW PROPORTIONING DEVICE AND MAGNETICALLY OPERATED VALVE THEREFOR

[72] Inventors: Dennis E. Jackson; Francis R. Rustin, both of Springfield, Mo.

[73] Assignee: Naremco Inc., Springfield, Mo.

[22] Filed: June 17, 1970

[21] Appl. No.: 46,860

[52] U.S. Cl.................................137/414, 137/416, 251/65
[51] Int. Cl.............................F16k 31/34, F16k 31/56
[58] Field of Search...........137/414, 416, 417; 4/223, 227, 4/252 A; 251/65, 75; 119/81, 78

[56] References Cited

UNITED STATES PATENTS

| | | | |
|---|---|---|---|
| 2,752,936 | 7/1956 | Cantalupo | 137/414 |
| 3,001,210 | 9/1961 | Diehl | 4/225 |
| 3,158,173 | 11/1964 | Bachli et al. | 137/414 |
| 2,921,319 | 1/1960 | Kivela | 4/252 A |
| 3,055,387 | 9/1962 | Eagar | 137/416 |
| 3,400,733 | 9/1968 | Scoppola | 137/416 |
| 3,385,316 | 5/1968 | Couffer | 137/414 |
| 3,285,277 | 11/1966 | Goldtrap | 137/414 |
| 1,248,650 | 12/1917 | Gustafson | 137/414 |

Primary Examiner—M. Cary Nelson
Assistant Examiner—David R. Matthews
Attorney—Bacon & Thomas

[57] ABSTRACT

A device for blending measured amounts of stock solution into drinking water for fowl and livestock, including a magnetically operated, instantly responsive water supply valve. The supply valve includes flow control means and a pilot valve for controlling the same, the pilot valve being operated by a lever arm having a float suspended therefrom. A magnet holds the lever arm in a first position until the float places sufficient pull thereon to overcome the magnetic attraction, whereupon the arm instantly changes to a second position and operates the pilot valve to open the flow control means. When the liquid level rises sufficiently to ease the pull of the float, the magnet snaps the lever arm back to its first position, thus instantly closing the supply valve.

13 Claims, 7 Drawing Figures

PATENTED APR 18 1972
3,656,506
SHEET 1 OF 2
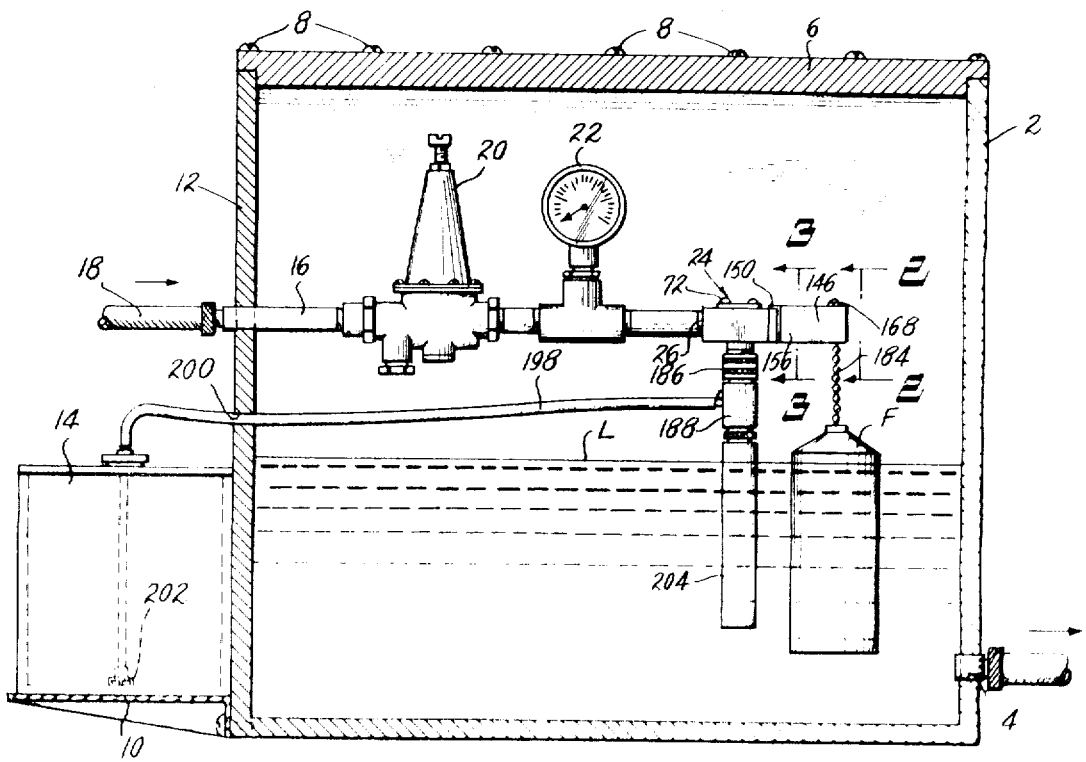
Fig.1.
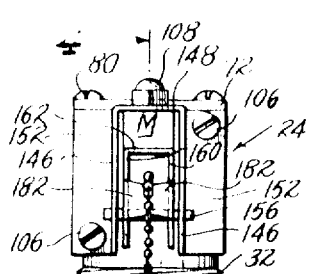
Fig.2.
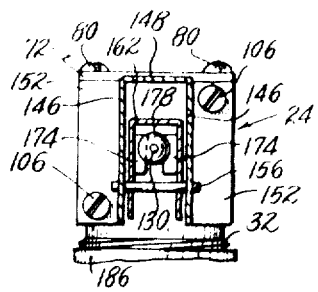
Fig.3.
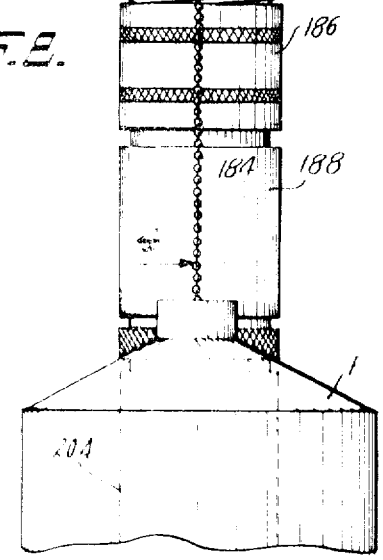
DENNIS E. JACKSON
FRANCIS R. RUSTIN
Bacon & Thomas
ATTORNEYS

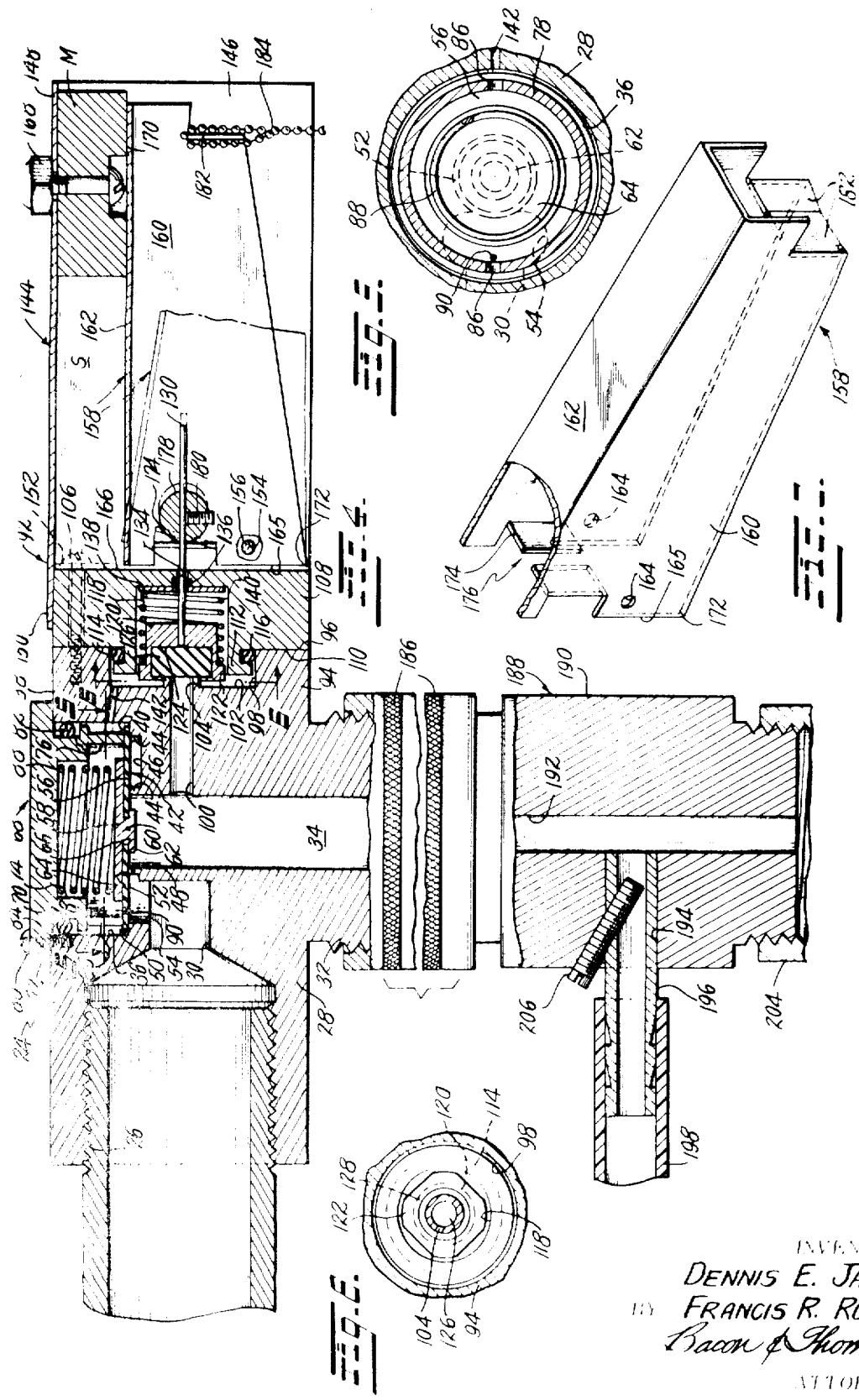

FLOW PROPORTIONING DEVICE AND MAGNETICALLY OPERATED VALVE THEREFOR

BACKGROUND OF THE INVENTION

1. Field of the Invention

The present invention relates generally to devices for proportioning a stock solution into drinking water for fowl and livestock, and more particularly to such a device designed to be instantly responsive, and effective to accurately maintain a desired ratio of stock solution to water volume.

2. Description of the Prior Art

One of the greater needs in commercial poultry and livestock production is for a dependable mechanical device which will properly, consistently, and automatically inject and blend into poultry and livestock drinking water a prescribed amount of stock solution containing water sanitizers, chemicals, vitamins, minerals, growth stimulants, medications and the like. While devices have been designed for this purpose, none has proved fully satisfactory. A common problem with present proportioning devices is that moving parts are subject to gumming, corrosion and frequent mechanical failure, which result in inconvenience and excessive maintenance costs.

Nor are currently available devices for this use always accurate to the desired degree (2 to 5 percent plus or minus) in proportioning the stock solution into poultry and livestock drinking water. This particular problem becomes more critical each day, because of growing concern on the part of State and Federal drug and feed regulatory agencies with the effect of toxic drugs and their residues in the animal or bird, and the edible tissues consumed by man. In the animal or bird, too little medication may result in failure to control disease, while an excess may result in economic loss through toxic damage to the animal or bird. In either case the result is loss of costly medications and/or chemicals, loss of production efficiency, and an increase in production costs. When excess medication results in excessive residues of drugs in the edible flesh, so that the flesh is contaminated and unfit for human food, heavy financial losses can result.

One of the greatest reasons for inefficiency of many previously proposed water additive proportioning mechanisms has been their inability to adapt to the inconsistencies and irregularities of drinking water demand in the production of animals or birds. In early morning and late afternoon birds and animals tend to feed more heavily than during other periods of the day or night. Drinking water demand increases concurrently, thus creating "peak demand" periods. During other parts of the day and night water demand is reduced, and at certain periods, especially during cold weather, or on cool nights, demand may be very low. Further, young birds and animals require a small volume of drinking water. As they grow, water demand increases daily throughout the growth period.

Some additive proportioning mechanisms currently in use operate fairly efficiently, for example, during peak demand periods, but during low flow periods may apportion little or none of the additive stock solution because the volume of water flow is not adequate to operate the proportioning mechanism. If the latter is adjusted to compensate for the low demand periods, then excessive amounts of the stock solution are apportioned during higher demand periods. Other previously proposed devices are effective for low demand use, but are unadaptable or impractical for high demand use.

There is thus a need for a sturdy, simply managed, trouble free proportioning device which operates safely and dependably within the desired concentration tolerances during both high and low drinking water demand periods, and the present invention satisfies that need.

SUMMARY OF THE INVENTION

The proportioning device of the invention is designed to be connected to an available farm or ranch water supply, and draws additive stock solution from a container for blending within close tolerances with drinking water from the supply. The device is automatic in operation, and requires no electricity or other external power source.

The present device includes a pressure regulator, a pressure guage and a water supply valve connected in series, the outlet of the water supply valve being connected through a siphon breaker to an aspirator injector designed to draw additive solution from its container and blend it with the drinking water. From the injector the blended water and additive are discharged into a storage tank, the outlet of which is connected to one or more watering devices for foul or animals. The water supply valve has a float connected thereto, which rises and falls with the liquid level within the storage tank, and which operates the supply valve.

The need for accurately proportioning additive solution with drinking water has already been emphasized, and the present invention is designed to achieve this end. The accuracy of an aspirator injector in blending one liquid with another is determined to a great extent by the type of flow through the main channel of the aspirator. If that flow is constant, then proportioning can be extremely accurate. On the other hand, a varying flow can result in improper proportioning.

The best condition to maintain in the present invention, then, would be a constant flow through the injector, when the water supply valve is open. Normal supply valves, however, produce a low flow when first opened, which rises to an operating level, and then slowly declines when the valve is closed.

To achieve the desired substantially constant flow, therefore, a unique water supply valve has been conceived for the present invention, a valve that moves instantly from a fully closed to a fully open position, and vice versa, whereby a substantially constant water flow is obtained. This enables the present proportioning device to operate within very close tolerances.

The water supply valve of the invention includes flow control means, and a pilot valve for controlling the same. The flow control means comprises a flexible diaphragm that seats on an annular seat formed about the open inner end of the outlet port in the valve body, said annular seat having an annular manifold groove thereabout that communicates with the valve inlet. When the diaphragm rests on the annular seat, flow from the manifold groove into the outlet port is blocked. A small movement of the diaphragm away from the annular seat, however, will instantly produce full communication of the outlet port with the manifold groove, whereby full flow through the valve occurs in an instant.

The diaphragm is pressure operated through a pilot valve, and the pilot valve is in turn operated by the float of the present device. The pilot valve includes a spring biased operating stem that is connected to a lever arm, the lever arm being pivoted at one end to a frame. A magnet is carried by the frame over the free end of the lever arm, from which free end the float is suspended.

When the liquid level within the storage tank is at an elevated or "full" stage, the float exerts no pull on the lever arm, and hence the free end of said arm is held by the magnet. When the lever arm is in this condition the pilot valve is closed, which in turn causes the flexible diaphragm to seat on its annular seat. As liquid is withdrawn from the storage tank the float places a steadily increasing pull on the lever arm, until finally the float pull exceeds the magnetic attraction. The lever arm then instantly snaps to a depressed position, which movement instantly opens the pilot valve.

When the pilot valve is opened, the diaphragm instantly moves to its open position, whereupon full flow is at once established through the injector. This flow continues while the pilot valve is open, causing the liquid level in the storage tank to rise, along with the float.

As the float rises, its pull on the free end of the lever arm is eased, until a point is reached where such pull is less than the attraction of the magnet. At this time the lever arm instantly moves to its raised position, whereupon the pilot valve is closed. Closure of the pilot valve causes the diaphragm to snap closed, thus instantly terminating flow through the injector.

The present device is placed in operation only when the level within the storage tank falls sufficiently. The storage tank acts as a reservoir to even out periods of peak and low flow, it only being necessary that the present device have a capacity in excess of expected peak demand. Thus, the problems of past devices concerned with peak and low flow are overcome. Whenever the present device is placed in operation, because the supply valve is instantly responsive between no flow and full flow, blending of stock solution with the drinking water within very close tolerances is obtained. Further, the present supply valve is designed to be trouble free in operation, and, therefore, can be left unattended indefinitely.

It is the principal object of the present invention to provide a flow proportioning device that is automatic in operation, and which can accurately blend additive solution with drinking water to within very close tolerances.

A further object is to provide a supply valve designed to move instantly between fully open and fully closed positions, whereby a constant flow therethrough when open is obtained.

Another object is to provide a supply valve operable in response to the position of a float, and which is instantly movable between fully closed and fully open positions.

Yet another object is to provide a proportioning device that will produce accurately blended additive solution and drinking water, under conditions of peak and minimum flow alike.

Other objects and many of the attendant advantages of the present invention will become readily apparent from the following Description of the Preferred Embodiment, when taken in conjunction with the accompanying drawings.

BRIEF DESCRIPTION OF THE DRAWINGS

FIG. 1 is a sectional, side elevational view of the proportioning device of the invention, showing the storage tank and the other components of the device;

FIG. 2 is an enlarged, fragmentary end view taken on the line 2—2 of FIG. 1, showing in particular the lever arm of the supply valve the mounting frame therefor, and the magnet and float for operating the lever arm;

FIG. 3 is an enlarged, sectional view taken on the line 3—3 of FIG. 1 showing the manner in which the pilot valve operating stem is connected to the lever arm;

FIG. 4 is an enlarged, fragmentary sectional view showing details of the supply valve;

FIG. 5 is a horizontal sectional view, taken along the line 5—5 in FIG. 4, showing details of the flow control diaphragm;

FIG. 6 is a view taken along the line 6—6 in FIG. 4, showing the resilient disk mounted in the flow control element of the pilot valve; and FIG. 7 is a perspective view, partially broken away, of the lever arm of the supply valve.

DESCRIPTION OF THE PREFERRED EMBODIMENT

Referring now to the drawings, the proportioning device of the invention includes a storage tank or reservoir 2, having an outlet 4 in the lower end thereof that is connected to one or a plurality of watering devices (not shown) for livestock or poultry. The tank 2 is closed by a lid 6 held in place by screws 8, and has a shelf 10 mounted on the lower portion of the rear wall 12 thereof for supporting a container 14 for holding an additive stock solution.

A pipe 16 extends through the upper portion of the tank rear wall 12, and is connected to a conduit 18 leading from a suitable source of water under pressure. Connected in series to the inner end of the pipe 16 are a conventional pressure regulator 20 and pressure gauge 22, and the unique water supply valve 24 of the present invention.

Water supply systems on farms and ranches, and elsewhere for that matter, frequently suffer from surges and drops in water pressure, which affect flow rates and hence accurate proportioning of additive solution into drinking water by use of an aspirator. The purpose of the pressure regulator 20 and the gauge 22 is to provide the means for establishing and maintaining a constant water pressure at the inlet 26 of the water supply valve 24.

The supply valve 24 includes a valve body 28 having a generally T-shape, the inlet port 26 being in one leg of the T and terminating in a reduced axial passage 30. The center leg 32 of the T-shaped valve body 28 is externally threaded, and has a vertical outlet port 34 extending therethrough that terminates in an enlarged, cylindrical diaphragm chamber 36 that extends inwardly from the flat upper surface 38 of the valve body.

The diaphragm chamber 36 includes a radial bottom wall 40, the outlet port 34 opening centrally thereon. An annular manifold groove 42 with parallel side walls 44 and a flat bottom wall 46 is formed in the wall 40 concentrically about the inner end of the outlet port 34, the inner diameter of the annular groove 42 being a little larger than the diameter of the outlet port whereby to form an annular rim 48 about the latter. The outer diameter of the annular groove 42 is smaller than the diameter of the chamber 36, whereby a diaphragm seat 50 is formed thereabout, the seat 50 lying in the same plane as the annular seat 52 formed by the end face of the rim 48.

The annular manifold groove 42 is connected with the inlet passage 30 by a short, oval shaped vertical passage 54. Thus, water entering the supply valve 24 through the inlet 26 flows into the passage 30, through the passage 54 into the manifold groove 42, and thence over the rim 48 and the annular seat 52 into the outlet port 34, when the annular seat 52 is open. The oval shape for the passage 54 is to provide for that passage a cross-section at least equal to that of the passageway 30, whereby full flow through the open valve 24 is made possible.

The inner end of the outlet port 34 is controlled by a flexible, circular diaphragm flow control element 56, which has an outer diameter slightly less than the diameter of the diaphragm chamber 36. The diaphragm 56 has a centrally positioned opening 58 therein of substantially smaller diameter than the outlet port 34, for receiving a metallic plate 60. The plate 60 includes a reduced lower portion 62 of substantially smaller diameter than the port 34, and an enlarged upper portion 64 having a diameter greater than that of the annular seat 52, but smaller than the outer diameter of the manifold groove 46. The plate portions 62 and 64 are connected by a smaller neck portion 66, of a size to fit snugly through the diaphragm central opening 58.

The diaphragm chamber 36 is closed by a cover 68, which comprises a cylindrical body 70 having a rectangular flange 72 on the outer end thereof, and containing a cylindrical bore 74. An enlarged counterbore 76 extends about half way into the bore 74, and the exterior of the body 30 is reduced in diameter over the length of said counterbore, whereby to form a cylindrical rim 78. The body 70 has a length such that when the flange 72 is engaged with the valve body upper surface 38, the lower face of the rim 78 will be in engagement with the diaphragm 56. The outer diameter of the rim 78 is sufficiently large to extend at least partially over the diaphragm seat 50, and in the inner diameter thereof is substantially larger than the inner diameter of the annular groove 42, whereby the central portion of the flexible diaphragm 56 is free for movement.

The cover 68 is secured in place by screws 80, and carries an O-ring seal 82 in a groove 84 therein that is effective to seal between the cover and the sidewall of the chamber 36. The reduced diameter cylindrical rim 78 is designed to have flow space on both the interior and the exterior thereof, communication between said flow spaces being assured by the presence of slots 86 in the rim 78 that extend the full height thereof.

A coil spring 88 is seated in the bore 74, the lower end thereof being in engagement with the upper portion 64 of the plate 60. The spring has a diameter greater than that of the annular seat 52 but less than that of the plate portion 64, and functions to urge the flexible diaphragm into engagement with the annular seat 52 to thereby close communication between the manifold groove 42 and the outlet port 34.

The flexible diaphragm 56 is operated by fluid pressure from the inlet port 26. The diaphragm has a small bleed part 90 therethrough, disposed centrally of the annular groove 42, and liquid from the groove 42 can thus flow through said bleed port 90 into the diaphragm chamber 36. In addition, leakage may occur from the annular groove 42 into the chamber 36 between the diaphragm 56 and the seat 50, such leakage flow being admitted to the central portion of the diaphragm through the slots 86. Fluid pressure thus established above the diaphragm 56, taken together with the force of the spring 88, results in the forces acting on the diaphragm from above exceeding those acting from below, causing the diaphragm to engage the annular seat 52 to thereby close the valve 24. Once thus closed, the supply valve 24 will remain closed until pressure within the chamber 36 is relieved sufficiently to allow fluid pressure in the annular groove 42 to overcome the spring 88 and move the diaphragm away from the annular seat 52.

Pressure within the diaphragm chamber 36 is controlled by a pilot valve assembly 92 mounted on the remaining leg 94 of the T-shaped valve body 28, said leg 94 terminating in a flat end face 96 having a cylindrical pilot valve chamber 98 formed therein. A pressure relief port 100 extends from the center of the end wall 102 of the chamber 98 to the outlet port 34, the inner end of said port being surrounded by a raised annular seat 104.

Attached to the valve body 28 by screws 106 is a rectangular pilot valve cover 108, the front face 110 thereof having a cylindrical boss 112 thereon that carries an O-ring 114 within a groove 116, and which is received within the outer end of the cylindrical chamber 98. The cover 108 has a cylindrical bore 118 therein extending axially of the boss 112, and which receives a pilot valve control element 120.

The control element 120 comprises a cylindrical body having a rectangular flange 122 on the front end thereof, the front face of said element having a recess 124 therein for receiving a circular resilient disk 126 that is held in place by a rim 128. One end of a valve stem 130 is secured in an axial bore 132 in the element 120, said valve stem extending outwardly through a larger axial bore 134 in the cover 108. An O-ring seal 136 is received in a recess at the inner end of the axial bore 132 and is held in place by a washer 138, a coil spring 140 being held under compression between the washer 138 and the flange 122, and functioning to seat the resilient disk 126 on the annular seat 104.

The front face of the boss 112 is spaced from the end wall 102 to provide flow space therebetween, and a passage 142 communicates said space with the diaphragm chamber 36 above the diaphragm 56. Thus, when the valve element 120 is unseated, fluid under pressure can flow from the chamber 36 through the passage 142, and thence through the relief port 100 into the outlet port 34.

Attached to the cover 108 by the screws 106 is a frame 144 having the shape of an inverted U, and which includes spaced parallel side walls 146 connected by a top wall 148, the top wall 148 having a tab 150 thereon that is engaged over the edge of the cover 108. Flanges 152 project from the inner vertical edges of the side walls 148, said flanges engaging the front face of the cover 108 and having holes therethrough to receive the screws 106.

The frame or holder sidewalls 146 have aligned bores 154 therethrough near the cover 108 and upwardly from the lower edges thereof, within which a pivot pin 156 is received. Mounted on the pivot pin 156 is a lever arm 158, made of magnetically attractable sheet material and including a pair of parallel sidewalls 160 joined by a top wall 162, the sidewalls 160 having aligned holes 164 therein to receive the pivot pin 156. The holes 164 are positioned near the inner or front edges 165 of the sidewalls 160 about one-third upwardly from the bottom thereof, and the arm 158 is mounted so that there is a narrow space between said first edges and the front face 166 of the cover 108 when the latter are parallel. The arm 158 is only about two-thirds the height of the frame sidewalls 146, and the pivot pin 156 and the holes 164 are positioned so that there is a space S between the top wall 162 and the top wall 148.

Received in the space S at the outer end thereof is a magnet M, which is secured to the top wall 148 of the frame 144 by a bolt 168. The magnet M is chosen so that the thickness thereof is equal to the space between the top walls 148 and 162 when such are parallel, whereby under these conditions the flat wall 162 will be in engagement with the flat bottom surface 170 of the magnet. This is the elevated, or "UP", position for the pivoted arm 158.

The inner or front edges 165 of the arm 158 extend at a right angle to the top wall 162, and thus are parallel to the wall 166 when the arm 158 is in its "UP" position. If a sufficient pulling force is exerted on the outer, free end of the lever arm 158 the force of the magnet M can be overcome, and the arm will pivot downwardly about the pin 156. Such movement will continue until the bottom, front corners 172 of the sidewalls 160 engage the surface 166. When the arm 158 reaches this position, it is in its depressed or "DOWN" condition, as shown by phantom lines in FIG. 4.

For proper operation of the invention the free outer end of the arm 158 must stay within the magnetic field of the magnet M, so that it will automatically return to the "UP" position when the pulling force thereon ceases. To achieve this result, the pin 156, the holes 164, the corners 172 and the space between the edges 165 and the surface 166 must all be properly chosen, this being a simple engineering matter.

About midway between the holes 164 and the top wall 162 tabs 174 are cut in the leading edges 165 of the sidewalls 160, and are bent toward each other until they lie in a common plane. The tabs 174 are dimensioned so that when they are in a common plane there is a space 176 therebetween, through which the pilot valve stem 130 extends. With the arm 158 in its "UP" position, and with the disk 126 engaged on the seat 104, a nut 178 is placed onto the free end of the stem 130, and is slid against the rear faces of the tabs 174 and secured by a set screw 180. Thereafter, when the arm 158 is pivoted to its "DOWN" position, the stem 130 will be operated to unseat the disk 126 and open the pilot valve 92. Upon return of the arm 158 to its "UP" position, the coil spring 140 will close the pilot valve 92.

Similarly, tabs 182 are cut in the outer or free edges of the sidewalls 160, and are bent toward each other to lie in a common plane. But in this instance there is no space between the confronting tabs 182. The tabs 182 are utilized to connect a chain 184 to the outer or free end of the arm 158, from which chain a float F is suspended. The float F is sufficiently heavy to overcome the force of the magnet M when hanging with near full weight from the arm 158, under which condition it is effective to move the arm from its "UP" to its "DOWN" position.

The float F floats in the liquid L contained in the storage tank 2. When the level of the liquid L descends, the float F will place an increasing pull on the arm 158 until the latter is moved to its "DOWN" position, whereupon the present proportioning device is activated to add more liquid L to the tank 2. As the level of the liquid L rises, it carries the float F upwardly with it, thus easing the pull on the lever arm 158. When the pull of the float F eases sufficiently, the magnet M will move the arm 158 to its "UP" position.

Because the float F is free to move in the liquid L, movements of the arm 158 between its "UP" and "DOWN" positions are not gradual, but rather are instantaneous "snap" actions. This snap action is important, and helps provide the instant response of the supply valve 24.

Referring again to the drawings, a siphon breaker unit 186 is connected to the center leg 32 of the supply valve 24, and connected in series therewith is an aspirator injector unit 188, comprising a body 190 having an axial bore 192 extending therethrough and which is intersected by a siphon bore 194. One end of a nipple 196 is secured in the bore 194, the other end of said nipple having a tube 198 secured thereto. The tube 198 extends through a hole 200 in the rear tank wall 12 and into the container 14, the outer end of said tube extending to the bottom of the container and having a conventional foot valve 202 mounted thereon.

The outlet end of the injector unit 188 has a discharge conduit 204 connected thereto, which extends down into the liquid L.

When water is flowing through the aspirator bore 192, stock solution from the container 14 will be drawn through the nipple 196 and will be blended with the flowing water. The foot valve 202 is employed to be certain that the additive solution of the be available to the injector immediately upon flow through the bore 192, and the amount of additive solution blended with the water will depend on the rate of water flow and the size of the passageway in the nipple 196. Since one of the purposes of the present invention is to provide constant flow through the aspirator unit 188 during each use, and identical flows every time the device is activated, once the size of the nipple 196 has been set the invention will provide the desired blend of treatment solution and drinking water to the tank 2 indefinitely, with no further attention.

To set the size of the nipple passageway, and hence the ratio of additive solution to water, the body 190 and the nipple 196 have a screw 206 threaded thereto at an angle. Obviously, when the screw 206 is threaded outwardly, the size of passageway through the nipple 196 is increased, and vice versa. Therefore, within the limit of the unrestricted size of the nipple, the ratio can be set to any desired ratio and can be changed when desired, merely by use of the screw 206. If the value of water pressure to be supplied the valve 24 by the regulator 20 is known in advance, then the screw 206 might be set in the factory. Otherwise, it can be set in the field.

In any case, once the regulator 20 and the screw 206 have been properly set, the present device will function indefinitely to produce a desired blend of additive solution and water, within very close tolerances. These close tolerances are achieved because of the ability of the supply valve 24 to move substantially instantly between "FULLY OPEN" and "FULLY CLOSED" positions, the manner in which the supply valve 24 so functions being as follows.

Assume at the beginning of an operating cycle that the level of the liquid L is elevated, so that the arm 158 is in its "UP" position, and that water under constant pressure is being supplied to the inlet port 26 of the supply valve 24. Under these conditions the pilot valve 92 will be closed, whereby pressure in the diaphragm chamber 36 is unrelieved. This pressure, coupled with the force of the spring 88, holds the diaphragm 56 in engagement with the seat 52.

As treated drinking water is withdrawn from the storage tank 2, the level of the liquid L will be lowered. This causes the float F to place increasing pull on the arm 158, until finally said arm will snap from its "UP" to its "DOWN" position, resulting in instant opening of the pilot valve 92, and a nearly instant relief of pressure in the diaphragm chamber 36. The passage 142, of course, must be sufficiently large to drain liquid from the chamber 36 at a faster rate than it can be supplied through the bleed hole 90, and/or by leakage around the diaphragm.

When pressure is relieved in the chamber 36, the diaphragm will move away from the annular seat 52 under pressure from water in the annular groove 42. Because such action will occur rapidly, and because only a small movement is required to open a large passage between the annular groove 42 and the outlet port 34, the supply valve in effect moves almost instantly from a "FULLY CLOSED" to a "FULLY OPEN" position, whereby a nearly instantaneous full flow is supplied the injector unit 188.

Once opened, the valve 24 will remain "FULLY OPEN" until the level of the liquid L rises sufficiently to raise the float F, whereby the arm 158 snaps to its "UP" position. The spring 140 will then effect instant closing of the pilot valve 92, whereupon a pressure buildup in the chamber 36 occurs. Because of the coil spring 88, only a very small pressure buildup in the chamber 36 is needed to move the diaphragm 56 into engagement with the seat 52. The necessary pressure increase thereof occurs rapidly, resulting in the valve 24 nearly snapping into its "FULLY CLOSED" position. This completes an operating cycle.

The present device can, of course, be put to uses other than proportioning treatment solution and drinking water. In particular, the magnetically operated supply valve 24, with its feature of producing constant flow from the instant of opening to the instant of closing, might be used in many environments. The valve 24 has no passages of critical size, and thus is not easily plugged. And the very small movements required for operation reduce wear to a minimum, thus helping to ensure long life.

Obviously, many modifications and variations of the invention are possible.

We claim:

1. In a proportioning device for blending an additive solution into drinking water for fowl and livestock, including a storage tank, a container for additive solution, a pressure regulated water source, a supply valve within said storage tank having an inlet port and an outlet port and a closure element therebetween, said inlet port being connected with said source of water, and an aspirator injector unit connected to said supply valve outlet and with said container, and including an outlet arranged to empty into said storage tank, the improvement comprising quick operating float control means for quickly moving said closure element between "FULLY OPEN" and "FULLY CLOSED" position whereby the flow of water through said injector unit will be at a constant rate during the replenishment of said tank, said float control means including: a control arm mounted for movement between closely spaced "UP" and "DOWN" positions; a magnet acting on said control arm to hold it in the "UP" position, the spacing between said "UP" and "DOWN" positions being such that the magnet will snap the arm from "DOWN" to "UP" position when opposing forces are insufficient to hold the arm down; and a float attached to said control arm receivable on the liquid in said storage tank and adapted to overcome the holding force of said magnet at a selected point during lowering of the level of said liquid in said storage tank, whereby said arm snaps from its "UP" position to its "DOWN" position, said magnet being effective to snap said arm back to its "UP" position at a selected point during raising of the level of liquid in said storage tank, said control means being effective to quickly move said closure element from "FULLY CLOSED" to "FULLY OPEN when said control arm snaps from its "UP" to its "DOWN" position, and vice versa.

2. In a proportioning device as recited in claim 1, wherein said control means further includes: a pilot valve connected with said closure element, said pilot valve including an operating stem, said operating stem being connected with said control arm for movement therewith and being effective to change the state of said pilot valve when said arm moves between its "UP" and "DOWN" position.

3. In combination: a vessel containing liquid; a valve body having an inlet port and an outlet port; a closure element between said inlet and said outlet ports; and float control means for quickly moving said closure element between "FULLY OPEN" and "FULLY CLOSED" positions, including: a frame; a control arm pivoted at one end to said frame, the other end of said arm being movable between "UP" and "DOWN" positions, said control means being effective to change the state of said closure element when the said other end of the control arm moves from one of said positions to the other; a magnet on said frame acting on said control arm to hold it in the "UP" position; and a float attached to said other end of said control arm receivable on the liquid in said vessel, and adapted to overcome the holding force of said magnet at a selected point during lowering of the level of said liquid whereby said control arm snaps from its "UP" position to its "DOWN" position, said magnet being effective to snap said arm back to its "UP" position at a selected point during subsequent raising of the level of said liquid in said vessel.

4. The combination as recited in claim 3, wherein said valve body further has an annular seat formed about the inner end of said outlet port, and encircled by an annular manifold groove, and groove being connected with said inlet port, and wherein said closure element comprises a flexible diaphragm mounted over said annular seat, and movable by said float control means into and out of engagement therewith.

5. The combination as recited in claim 4, wherein said float control means includes a pilot valve, said pilot valve being connected to operate said diaphragm, and in turn being operated by said control arm.

6. The combination as recited in claim 5, wherein said pilot valve includes an operating stem, said operating stem being connected with said control arm for movement therewith and being effective to change the state of said pilot valve when said arm pivots between its "UP" and "DOWN" positions.

7. In combination: a vessel for receiving liquid; a float within said vessel; a valve, including an operating stem; a frame connected with said valve; a control arm pivoted at one end to said frame, and movable vertically between "UP" and "DOWN" positions, said operating stem being connected with said control arm for movement therewith and being effective to change the state of said valve when said arm pivots between said positions; means connecting said float with the other end of said arm, whereby said float exerts increasing pull on said arm as the liquid height in said vessel falls, and vice versa; and a magnet on said frame above said other end of said arm, said magnet being effective to snap said arm into said "UP" position at a selected point during elevation of said float because of an increasing liquid height in said vessel, and said float being effective to overcome said magnet and snap said lever into its "DOWN" position at a selected point during lowering of said liquid level.

8. A quick-acting float valve, comprising: a valve body having an inlet port and an outlet port; the inner end of said outlet port being separated from said inlet port and having an annular seat thereabout, said seat being encircled by an annular manifold groove, and said groove being in communication with said inlet port, said valve body further including a diaphragm chamber; a diaphragm within said diaphragm chamber, and movable into and out of engagement with said annular seat; a spring within said diaphragm chamber biasing said diaphragm toward said annular seat; passage means for bleeding pressure from said manifold groove into said diaphragm chamber; means, including a pilot valve, communicating said diaphragm chamber with said outlet port, and operable to effect instant seating and unseating of said diaphragm, said pilot valve including an operating stem that projects from said valve body and which when moved is effective to change the state of said pilot valve, and hence of said diaphragm; a control arm having a float connected to one end and being pivotally connected to said valve body and to said pilot valve stem for movement of said stem, and a fixed magnet acting on said control arm to provide in cooperation with said float a snap movement of said control arm between "UP" and "DOWN" limits.

9. A flow control valve as recited in claim 8, including additionally: a frame connected to the valve body; the control arm being pivoted at one end to said frame, the other end of said control arm being movable between "UP" and "DOWN" positions, said operating stem being connected with said control arm and being moved thereby to change the state of said pilot valve when said other end of said control arm moves from one of said positions to the other; the magnet being mounted on said frame for moving said other end of said arm toward its "UP" position; and the float being suspended from said other end of said arm, effective when the weight thereof is fully applied to said arm to overcome said magnet and pivot said arm from its "UP" to its "DOWN" position.

10. A flow control valve as recited in claim 9, including stop means to limit the downward movement of said other end of said control arm, whereby it always remains within the force field of said magnet.

11. A quick-acting float valve comprising: a valve body having an inlet port and an outlet port; a diaphragm valve closure member in said valve body arranged to operate between fully closed and fully opened positions to thereby control fluid flow from said inlet port to said outlet port; resilient means urging said diaphragm closure member toward said closed position against the fluid pressure on one side of said member from said inlet port; means for transmitting fluid pressure from said inlet port to the other side of said diaphragm closure member for cooperation with said resilient means to maintain said diaphragm member in its closed position; pilot valve means in said valve body for relieving said fluid pressure from said other side of said diaphragm valve closure member to permit said valve to be opened by fluid pressure from said inlet port, said pilot valve means including a stem extending from said valve body; a frame extending from said valve body substantially parallel to said pilot valve stem, a control arm pivotally connected to said frame and to said pilot valve stem adjacent the valve body and extending from said valve body cojointly with said frame, a magnet fixed to said frame at its outer end, said magnet being arranged to act upon the outer end of said control arm and said control arm being movable around said pivotal connection between limits whereby it always remains within the force field of the magnet; and means for attaching a float to said control arm for exerting force on said arm in opposition to said magnetic force.

12. A quick-acting float valve comprising a valve body containing a main valve and a pilot valve for operation of said main valve, said pilot valve including a stem extending from said valve body, a frame extending from said valve body and having a magnet mounted at substantially its outer end, a valve control arm extending from said valve body conjointly with said frame, the end of said control arm adjacent said valve body being pivotally connected to said frame and arranged to act upon said valve stem upon movement around said pivotal connection, the outer end of said control arm being within the force field of said magnet and being urged thereby to a position at which said valve stem closes said pilot valve, and the outer end of said control arm having means for attaching a float to said arm for exerting force on said arm in opposition to said magnet.

13. The float valve defined in claim 12 wherein said frame is of substantially U-shaped configuration having downwardly extending legs, said control arm is of smaller U-shaped configuration and is pivotally mounted between the legs of the frame and said magnet is fixed to the frame between the bottom of the U of the frame and the top of the U of the control arm, the downwardly extending legs of the frame providing a guide for the control arm during its movement.

* * * * *